2,947,649
Patented Aug. 2, 1960

2,947,649
CHEMICALLY BONDED BASIC REFRACTORY

Ben Davies, Pittsburgh, Pa., assignor to Harbison-Walker Refractories Company, Pittsburgh, Pa., a corporation of Pennsylvania No Drawing. Filed July 18, 1956, Ser. No. 598,515

10 Claims. (Cl. 117—118)

This invention relates to refractory brick and other shapes, and in particular it is concerned with a method of making unburned basic refractory shapes that are characterized by resistance to water.

The utility of unburned basic refractory shapes, such as brick, is established in the metallurgical arts such as in the production of steel. These shapes or brick are chemically bonded basic refractories that are installed at the point of use without prior firing, and are then fired in use. Commonly an inventory of the refractory shapes is maintained at the steel plant or other place of use to permit the repair or replacement of refractory parts when opportunity arises or necessity dictates. Such stocks are generally housed under cover, but occasionally the refractories will come into contact with water. This can occur due to leaky walls or roof, or to water running in on the floor. More commonly, it may occur due to rain falling on the brick in transit from the manufacturer's plants or warehouses to the metallurgical plant, or from one point to another within the latter plant. If the refractories are not water resistant, water contacting them may cause the shapes to slake whereby their usefulness is destroyed, resulting in economic loss.

It is an object of this invention to provide a method of making unburned basic refractory brick and other shapes that are resistant to slaking in water, which is simple, inexpensive, and does not interfere with or require material change in existing methods for the production of such shapes.

It is another object of the invention to provide unburned basic refractory brick and other shapes that are resistant to slaking in water.

Conventional practices of preparing chemically bonded unburned basic refractory brick and other shapes are applicable to the present invention. In general they involve grinding the basic refractory materials, such as chrome ore, magnesia, e.g. as dead burned magnesite, and such forsteritic materials as olivine, and grading the resultant material to the desired grain size. The constituents for the desired formulation are then weighed out and combined in a mixer into which the bonding ingredients are also fed, usually with the addition of water, if needed, to give the mix a proper consistency. The mixed batch is then hand shaped or charged to a suitable forming machine such as a press which forms the mix to the desired shape, usually at a pressure of 5000 p.s.i. or higher. The shapes as taken from the press are hacked on pallets or dryer cars and passed to a dryer. The drying operation serves to drive off water and to set or harden the bonds so that the brick are strong enough to ship. Usual drying temperatures may be 150° to 400° F., depending upon the particular bond used and the temperature needed to give it maximum strength.

Basic refractory shapes prepared in the manner just described, particularly those that are bonded with materials such as waste lignin liquor, sulphuric acid, epsom salts, nitre cake, sodium silicate and the like will slake in water. Indeed, even when attempting to provide water resistance to shapes bonded with lignin liquor by using procedures found in the literature, for example, by using alkalies, I have found that the resultant shapes will slake.

In accordance with this invention a chemically bonded unburned basic refractory shape containing at least a critical minimum amount of free or uncombined magnesia (MgO), e.g. at least five percent by weight, is made water resistant by treating the shape with a water-soluble phosphate in an amount sufficient to react with the refractory surface and render it water resistant. The phosphate may be applied to the surface of the shape as by spraying, or by immersing the shape in a phosphate solution, or by other procedure whereby opportunity for reaction of the phosphate and the magnesia is presented. The phosphate treated shape is then dried at a temperature determined by the bonding material. The resultant dried shape may be exposed to water without experiencing the slaking characteristic of such shapes produced without the phosphate treatment.

I have found that the phosphate chemicals are best applied to the refractory shapes before they are dried but that the process is almost equally effective when the phosphate is applied to the shapes after they have been dried. A redrying step may then follow the application of phosphate.

Most suitably the water-soluble phosphates used in the practice of the invention are acidic. Examples are monoammonium phosphate ($NH_4H_2PO_4$), diammonium phosphate ($(NH_4)_2HPO_4$), monosodium phosphate $$(NaH_2PO_4)$$

disodium acid pyrophosphate ($Na_2H_2P_2O_7$), phosphoric acid ($H_3PO_4$). However, such basic, or normal phosphates as sodium orthophosphate ($Na_3PO_4$) may be used. The phosphates are preferably used as concentrated or even saturated solutions; dilute solutions also may be used but in that event more than a single spraying or dipping of the shape may be required to provide phosphate for reaction with the basic shape that is sufficient to render the shape water resistant.

Refractory brick and other shapes with which the present invention may be practiced are chemically bonded unburned basic refractories containing a magnesian material in an amount of at least 5 percent by weight and suitably 10 to 80 percent by weight. Dead burned magnesite is especially suitable as the magnesian material. When preparing a refractory shape with the magnesite content in the lower portion of the range, e.g. 30 percent or less, the magnesite is used to most advantage in a relatively fine ground state to increase its reactivity. In instances where it is desired to use a minimum amount of magnesian material, e.g. 5 to 10 percent, reactive caustic calcined magnesite is especially suitable.

As illustrating the invention, brick were prepared from a mix of Philippine chrome ore and dead burned magnesite in a ratio of chrome ore to magnesite of 80:20 by weight. The refractories were ground, separately, in a dry pan and screened to provide appropriate grain size fractions which were then combined to yield a refractory mix of the desired weight ratio and sizing. A screen analysis of the refractory mix showed the grain sizing, by weight, to be as follows:

| Mesh: | Percent |
|---|---|
| Pass 3 on 10 | 26 |
| Pass 10 on 28 | 21 |
| Pass 28 on 65 | 16 |
| Pass 65 | 37 |

Analysis of the refractory mix showed its composition to be, by weight, as follows:

| | Percent |
|---|---|
| Silica | 5.8 |
| Alumina | 23.7 |
| Iron oxide | 10.0 |
| Lime | 0.8 |
| Magnesia | 32.1 |
| Chromic oxide | 24.6 |
| Ignition loss | 3.0 |

Lignin waste liquor, concentrated to 50 percent solids, was added to the mix for bonding purposes, and 2 percent, by weight, of ball clay was incorporated to improve plasticity of the mass. The mix was charged to a heavy duty press and brick were pressed therefrom at a pressure of 4000 p.s.i. The resultant brick were dipped in phosphate solutions, as indicated in Table I below, and were then placed on pallets and air dried for two to five hours, and then oven-dried for twelve hours at 230° F. The phosphate solutions that were used were prepared by adding the phosphate salt in excess of the amount that could dissolve, to a fixed volume of water; the mixtures were periodically shaken during several days, then allowed to stand overnight, and the resultant clear supernatant solution was recovered and used as just indicated. The $H_3PO_4$ solution was prepared by diluting more concentrated acid to a concentration of 25 percent by weight.

After drying, the brick were broken in half and immersed in a pan of water for 24 hours and then inspected. The brick were given a rating determined as follows: "C" to indicate the fines and coarse grains of brick slake off immediately after water immersion, the brick corners and edges become very soft, and the water becomes very muddy; "B" to indicate that fines do not slake out of brick but the corners become soft after being immersed in water for several hours; "A" to indicate that no slaking occurs and that the corners and edges remain firm although they are softer than they were before being immersed, and the water discolors to a light yellow. The data obtained are:

Table I

| Phosphate solution | Type Phosphate | Water resistance rating |
|---|---|---|
| 1. Monoammonium Phosphate ($NH_4H_2PO_4$) | Acid | A |
| 2. Diammonium Phosphate (($NH_4$)$_2HPO_4$) | Acid | A– |
| 3. Monosodium Phosphate ($NaH_2PO_4$) | Acid | A |
| 4. Trisodium Phosphate ($Na_3PO_4$) | Basic | B |
| 5. Disodium Acid Pyrophosphate ($Na_2H_2P_2O_7$) | Acid | A |
| 6. 25% Phosphoric Acid ($H_3PO_4$) | Acid | A |
| 7. Untreated | | C |

From these data, it is apparent that the method of this invention results in unburned basic magnesia-containing refractory brick of improved resistance to slaking in water (compare Example 7 with any of Examples 1 through 6). By comparing Example 4 with any of Examples 1, 2, 3, 5, or 6, it can be observed that in the runs conducted, the use of an acid phosphate in treating the brick resulted in a water resistance that was better than that resulting upon use of a basic phosphate.

Brick were prepared, by the procedure just described, from a blend of magnesite and chrome ore in a weight ratio of 57 to 43. The screen analysis of the refractory mix, by weight, was as follows:

| Mesh: | Percent |
|---|---|
| Pass 4 on 10 | 22 |
| Pass 10 on 28 | 24 |
| Pass 28 on 65 | 15 |
| Pass 65 | 39 |

Analysis of the batch showed the composition to be by weight, as follows:

| | Percent |
|---|---|
| Silica, $SiO_2$ | 5.8 |
| Alumina, $Al_2O_3$ | 15.0 |
| Iron oxide, FeO | 6.8 |
| Lime, CaO | 1.3 |
| Magnesia, MgO | 52.9 |
| Chromic oxide, $Cr_2O_3$ | 15.3 |
| Ignition loss | 2.9 |

The brick were sprayed with a solution of monoammonium phosphate prior to drying, after which they were dried and tested in the manner described above. The test results showed that the phosphate treatment markedly improved the water resistance of the brick.

Brick were prepared, by the procedure hereinbefore described, to demonstrate the criticality of the presence of magnesia in refractory shapes treated in accordance with this invention. The refractory mixtures used were Philippine chrome ore and (a) magnesite, (b) calcium hydrate, (c) aluminum hydrate, and (d) iron oxide, in a weight ratio of chrome ore to the other component of 90 to 10. The screen analysis of the chrome ore-magnesite mixture used to prepare the brick (brick 1) was, by weight:

| Mesh: | Percent |
|---|---|
| Pass 3 on 10 | 26 |
| Pass 10 on 28 | 21 |
| Pass 28 on 65 | 16 |
| Pass 65 | 37 |

The chemical composition, by weight, of the refractory mixture from which brick 1 were prepared was as follows:

| | Percent |
|---|---|
| Silica, $SiO_2$ | 5.0 |
| Alumina, $Al_2O_3$ | 27.4 |
| Iron oxide, FeO | 11.8 |
| Lime, CaO | 0.6 |
| Magnesia, MgO | 25.6 |
| Chromic oxide, $Cr_2O_3$ | 29.7 |

The brick of each composition were phosphate treated by being dipped in saturated phosphate solutions and, after drying, were tested for water resistance by immersing in water as described above. The data are:

Table II

| | Chrome Ore and— | | | |
|---|---|---|---|---|
| | 1 | 2 | 3 | 4 |
| | 10% Magnesite | 10% Calcium Hydrate | 10% Aluminum Hydrate | 10% Iron Oxide ($Fe_2O_3$) |
| Water resistance rating, Phosphate Solution: | | | | |
| 8. Monoammonium phosphate ($NH_4H_2PO_4$) | A | C | C | C |
| 9. Disodium Acid Pyrophosphate ($Na_2H_2P_2O_7$) | A | C | C | C |

These data demonstrate the presence of magnesia is critical for the purposes of this invention, for brick that did not contain magnesia (note 2, 3, and 4 in Table II) were rated "C" upon being examined after testing. The ratings in Table II are, of course, on the same basis as those indicated in connection with Table I.

While the invention has been described with particular reference to chemically bonded unburned basic refractories of chrome ore and magnesia, unburned basic refractory shapes formed of or containing other refractories, such as forsterite, magnesite, dead burned magnesite, chrome and the like, may be treated in accordance with the invention as long as at least 5 percent of magnesia is included. The invention also is applicable to chrome ore-magnesite formulations other than that of the examples and includes those mixes that contain the magnesium material as the major component. Similarly, the invention is applicable to metal cased chemically bonded unburned basic refractories.

In accordance with the patent statutes I have explained the principle of my invention and have described what I now believe to represent its best embodiment. However, I desire to have it understood that, within the scope of the appended claims, the invention may be practiced otherwise than as specifically described.

I claim:

1. That method of preparing an unburned basic refractory shape that is resistant to slaking by water, comprising forming to the desired shape a mixture of a chemical bonding agent and refractory material that includes at least 5 percent by weight of uncombined magnesia refractory, contacting only the surface of the resultant shape with a water solution of a water-soluble phosphate, then drying the phosphate treated shape and recovering the resulting dried, surface treated, unburned refractory shape produced.

2. A method according to claim 1, said water-soluble phosphate being sprayed on the surface of said shape.

3. A method according to claim 1, said magnesia refractory being selected from the group consisting of dead burned magnesite and caustic calcined magnesia.

4. A method according to claim 1, said water-soluble phosphate being an acid phosphate.

5. A method according to claim 4, said phosphate being monoammonium phosphate.

6. A method according to claim 4, said phosphate being diammonium phosphate.

7. A method according to claim 4, said phosphate being monosodium phosphate.

8. A method according to claim 4, said phosphate being disodium acid pyrophosphate.

9. A method according to claim 4, said phosphate being phosphoric acid.

10. As a new manufacture, an unbunred chemically bonded basic refractory shape, formed of refractory material including at least 5 percent by weight of uncombined magnesia refractory, having only on its surface a layer of the reaction product of magnesia and a soluble phosphate and characterized by possessing resistance to slaking in water.

References Cited in the file of this patent

UNITED STATES PATENTS

| | | |
|---|---|---|
| 2,152,152 | Prosen | Mar. 28, 1939 |
| 2,232,462 | Lower | Feb. 18, 1941 |
| 2,479,504 | Moore et al. | Aug. 16, 1949 |
| 2,589,157 | Stalhane | Mar. 11, 1952 |
| 2,683,667 | Utter | July 13, 1954 |
| 2,741,565 | Halversen et al. | Apr. 10, 1956 |
| 2,805,174 | Veale | Sept. 3, 1957 |